UNITED STATES PATENT OFFICE.

RICHARD SAMESREUTHER, OF DUSSELDORF, GERMANY, ASSIGNOR OF ONE-HALF TO THE FIRM OF AUTOGENWERK SIRIUS, GESELLSCHAFT MIT BESCHRANKTER HAFTUNG, OF DUSSELDORF-ELLER, GERMANY.

FLUX FOR WELDING NICKEL AND NICKEL ALLOY.

1,224,418.     Specification of Letters Patent.     Patented May 1, 1917.

No Drawing.     Application filed December 29, 1914. Serial No. 879,445.

*To all whom it may concern:*

Be it known that I, RICHARD SAMESREUTHER, a subject of the German Emperor, and resident of Dusseldorf, Rhineland, Germany, have invented a new and useful Flux for Welding Nickel and Nickel Alloys, of which the following is a specification.

In autogenous welding of nickel and nickel-alloys by using an oxygen-welding-pipe, it has been found that the heated metal absorbs certain quantities of oxygen or other gases, which are freed at the moment of cooling, thus making the welded piece brittle and porous.

My invention consists in a flux for welding nickel and nickel-alloys which avoids the above stated objections.

According to my invention I use in conjunction with metal chlorids and chromium a flux of fire-proof materials which have the property of avoiding the influence of the atmosphere upon the melted metal. This flux contains alkalis as its essential substance which may be mixed with metal-chlorids. The flux may be in the form of a paste or of a powder.

The alkali, say waterglass, covers the welding piece with a fire-proof film thus avoiding the influence of the atmosphere upon the heated metal, whereas the metal-chlorids, such as chlorids of magnesium or molybdenum, decompose the metal combining with the nickel and the chlorids, dissolving the oxids of nickel. An addition of chlorid of calcium may be used in order to dissolve any possible slags.

The filling-wire consists of nickel with an addition of chromium or chromium-compounds. This addition has the purpose of dissolving the fire-proof film formed by the alkali at the very point of the welding seam. Other metals, principally copper and molybdenum, may also be added to the filling-wire according to the kind of metals to be acted upon, in order to obtain a welding-seam that may be equal to the body of the work piece.

The essence of my invention is that in order to effect a proper welding of nickel or nickel alloys, there must be present (in addition to metal of the same character as the one to be welded), three substances or ingredients, viz: first, alkali, second metal chlorid, and third, chromium. The purpose of the alkali is, stated above, to form a fire-proof film during welding. This film, however, would prevent the parts to be welded, from fusing together, and to avoid this detrimental action, metal chlorid and chromium are used during the welding process.

I claim:

1. Flux for autogenous welding of nickel consisting of a mixture of alkali, metal chlorid and chromium to be applied on the edges of the weld and on the filling wire.

2. Flux for autogenous welding of nickel consisting of a mixture of alkali, metal chlorid and chromium, whereof part of the substances is combined to make a paint to be applied on the edges of the weld and on the filling wire and part of the substances is incorporated in the filling wire.

In testimony whereof I have hereunto set my hand in the presence of two witnesses.

RICHARD SAMESREUTHER.

Signed in presence of—
    KURT DEGEN,
    J. WIGNEN.